United States Patent [19]

Allen et al.

[11] 4,378,921
[45] Apr. 5, 1983

[54] NEGATIVE ROTATION CINCH STRAP

[75] Inventors: Ronald E. Allen, Fleet Post Office, N.Y.; Robert J. Hudson, Ridgecrest; Marshall W. Hager, China Lake, both of Calif.

[73] Assignee: The United States of America as represented by the Secretary of the Navy, Washington, D.C.

[21] Appl. No.: 293,559

[22] Filed: Aug. 17, 1981

[51] Int. Cl.³ .................. B64D 17/30; A62B 35/00; B68B 5/00
[52] U.S. Cl. ................................ 244/151 R; 182/6; 24/182
[58] Field of Search .......... 244/151 R, 151 A; 24/163 R, 164, 182, 265 R, 68 R, 68 SB, 31 V, 306, 309; 224/153 L; 119/96; 182/3, 6, 7

[56] References Cited

U.S. PATENT DOCUMENTS

| | | | |
|---|---|---|---|
| 2,375,631 | 7/1949 | Miller et al. | 244/151 |
| 2,643,836 | 6/1953 | Carroll | 244/151 |
| 2,979,028 | 4/1961 | Zakely | 119/96 |
| 3,154,272 | 10/1964 | Gold | 244/151 |
| 3,165,168 | 1/1965 | Rose | 182/3 |
| 3,424,134 | 1/1969 | Rosenblum | 119/96 |
| 3,559,932 | 2/1971 | Ternes | 244/151 R |
| 3,947,927 | 4/1976 | Rosenthal | 24/306 |
| 4,090,683 | 5/1978 | Derrien et al. | 244/151 |

FOREIGN PATENT DOCUMENTS

| | | | |
|---|---|---|---|
| 447998 | 4/1948 | Canada | 244/151 R |
| 790246 | 5/1935 | France | 244/151 R |

Primary Examiner—Trygve M. Blix
Assistant Examiner—Rodney Corl
Attorney, Agent, or Firm—Robert F. Beers; W. Thom Skeer

[57] ABSTRACT

An improved unitary parachute torso harness, having a single fastening means, wherein an auxiallary tightening strap is attached to the groin straps of said harness. Said auxillary straps are used to prevent torso rotation or harness slippage and to prevent harness elongation in the groin and chest area.

6 Claims, 2 Drawing Figures

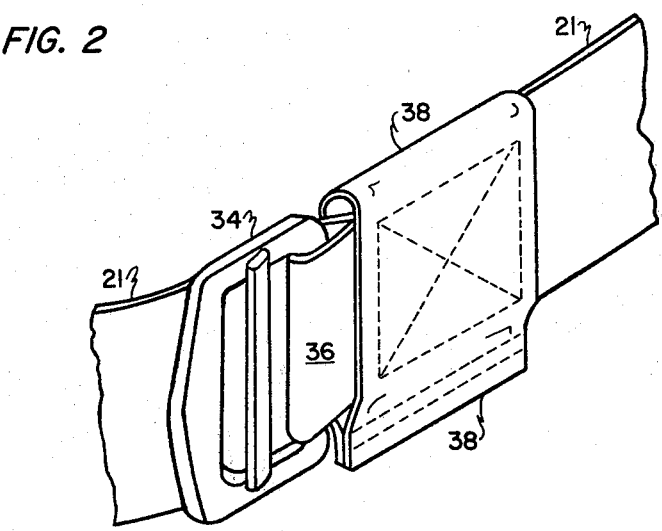

NEGATIVE ROTATION CINCH STRAP

BACKGROUND OF THE INVENTION

1. Field of the Invention

This invention relates to parachute harnesses. In particular the invention relates to parachute harnesses of the MA-2 type having a single fastening and adjusting feature. By way of further characterization the invention is described as an apparatus for preventing injuries associated with the shock of a parachute opening when using a harness of the MA-2 type.

2. Description of the Prior Art

The MA-2 parachute harness is the standard harness used by Naval aviators. It has a single fastener, located at chest level on the wearer, by which the MA-2 is secured to the wearer. A pair of straps connected to this fastener are connected to the remainder of the harness in such a manner that pulling said straps tighten the harness in the shoulder and saddle area simultaneously.

The MA-2 harness is provided in 16 different sizes to accomodate most wearers, however, the single tightening mechanism can only tighten the harness to fit the wearer within the tolerances determined by the amount of material, i.e. total strap length in the particular harness. As a result, when the parachute is actually used the opening shock is sufficient to cause the wearer to rotate forwardly or slide within the harness.

This relative movement frequently causes the saddle strap to slip up rearwardly from beneath the wearers seat, drawing the groin straps into the crotch in an abrasive and harsh manner which can cause injury to the wearer.

As the wearer slides within the harness, any and all slack is transferred to the upper portions of the harness, thereby creating a possibility of traumatic contact between the users head or face and the heavy metallic fittings, such as koch fittings, which are used to attach the parachute canopy to the harness.

An additional problem noted particularly by female aviators concerns the chest strap by which the MA-2 is secured to the wearer. Since the chest strap is directly connected to the groin straps, the chest strap suffers vertical displacement as the groin straps are drawn into the crotch, thereby exerting an abrasive force in the chest of the wearer which is particularly uncomfortable for female aviators.

SUMMARY OF THE INVENTION

In accordance with the present invention these objections to the MA-2 type harness are overcome by providing an adjustment for the groin straps of said harness whereby the groin straps can be tightenened in addition to the chest strap tightening mechanism. This is accomplished by the use of a second strap and fastening means paralleling the groin strap which can be used to hold the groin straps in place during opening shock, thereby eliminating the sliding tendency.

OBJECTS OF THE INVENTION

It is an object of this invention to prevent groin area injuries to the users of the MA-2 type harness.

It is a further object of this invention to prevent chest injuries to users of the MA-2 type harness.

It is another object of the invention to prevent head and/or facial injuries to the user of the MA-2 harness.

These and other objects and features of the invention will appear from the following description thereof in which reference is made to the accompanying drawings.

DESCRIPTION OF THE DRAWINGS

FIG. 2 is a view of the strap retainer sub-assembly of the present invention.

DESCRIPTION OF THE PREFERRED EMBODIMENT

Figure 1:
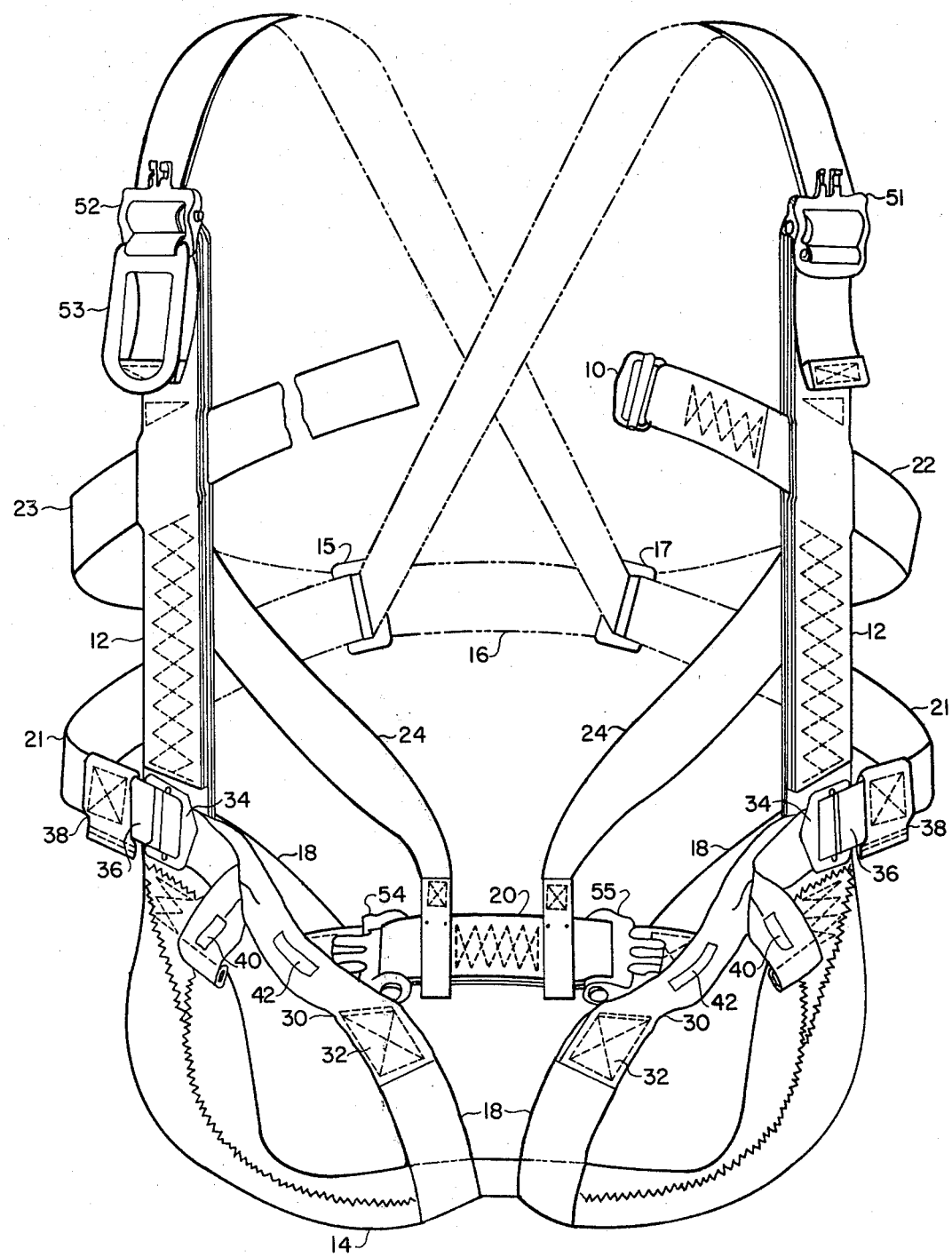
FIG. 1 is a perspective of an MA-2 parachute harness with the present invention installed.

The invention was designed to modify the existing MA-2 type parachute torso harness. A MA-2 harness with the invention installed is shown in FIG. 1 wherein a main fastening buckle 10 is secured to one end of a chest strap 22. A second chest strap 23 is threaded through buckle 10 to complete the fastening of the harness onto the wearer. Both chest strap 22 and 23 pass through one of two main lift webbings 12 vertically oriented on the forward side of the wearers body. Main lift webbings 12 are in the primary stress loading regions of the harness and are thus fabricated from multiple layers of webbed straps. Attached to main lift webbing 12, and extending from the top thereof, is a shoulder strap 16 which is designed to cross the shoulder, run diagonally across the wearers back to a D-ring 15, thence run horizontally to a D-ring 17, thence run diagonally across the back and over the shoulder where it attaches to opposite main lift webbing 12. Also integrated onto main lift webbing 12 is a saddle strap 14 which runs from the bottom of one main lift webbing 12 to the other main lift webbing 12.

After passing through main lift webbing 12, a plurality of chest straps 22 and 23 encircle the chest until they are deflected through D-rings 15 and 17. Upon passing through D-rings 15 and 17, chest straps 22 and 23 turn to run diagonally down the wearers back and about the torso and are thus renamed for clarity diagonal back straps 21. Diagonal back straps 21 are routed around the torso and pass through main lift webbing 12 near saddle strap 14. After passing through main lift webbing 12, diagonal back straps 21 are more properly called groin straps 18. Groin straps 18 are attached to saddle strap 14 so as to pass between the wearers legs. A lap strap 20, for holding groin straps 18 in place and for providing a place to attach the parachute proper, is attached between groin straps 18. A plurality of lap strap alignment straps 24 run from lap strap 20 to main lift webbing 12.

Fittings 51 through 55 are shown as connecting points to the parachute proper but are not germane to the present improvement for any other purpose.

The present improvement resides in integrating items 30 through 42 of FIG. 1 into the above described harness. A webbed strap 30 is affixed to each groin strap 18 by stitching 32 at a point just below the attachment of lap strap 20. A fastening buckle 34 is attached to a buckle strap 36 which is fastened to a strap retainer 38 as shown in FIG. 1 and FIG. 2.

Referring again to FIG. 1 only, strap retainer 38 is slideably mounted about diagonal back strap 21 aft of main lift webbing 12. A strip of reusable adhering material 40 is affixed to strap 30 near its bitter end and a mating strip of said material 42 is affixed to strap 30 near its attachment to groin strap 18. VELCRO, a registered trademark of Velcro USA Inc. for hook and loop fasteners is a material having the desired characteristics which is well known in the art.

In operation, strap 30 is threaded through buckle 34 and adjusted to obtain the required tightness. Buckle 34 is a friction adapter type buckle whose gripping force increases proportionately with the longitudinal tension of strap 30.

Tightening strap 30 shortens the effective length of groin strap 18 thereby putting saddle strap 14 forward, and causes strap retainer 38 to extend a forward force on main lift webbing 12 which in turn urges saddle strap 14 more firmly against the wearers seat. The interaction of the above elements prevents the slippage of saddle strap 14 and groin straps 18, thus also preventing the slippage of chest straps 22 and 23, while maintaining the unitary construction of the MA-2 type parachute torso harness.

Since various alternatives may suggest themselves to those skilled in the art without departing from the scope and principles of the invention which is defined in the appended claims, it is to be understood that the above drawings and description are intended as illustrations of a typical embodiment rather than a limitation.

What is claimed is:

1. An improved parachute torso harness having a unitary construction utilizing a single fastening means across the front of the torso, said construction including a pair of vertically oriented main lift webbings, a saddle strap attached to the bottom ends of said main lift webbings, a pair of groin straps connected to said saddle strap and passing slidably through said main lift webbing, a lap strap connected to each groin strap, a pair of diagonal backstraps connected to said groin straps terminating in said fastening means at the front of said torso, wherein the improvement comprises:
    a pair of webbed straps each attached to each of said groin straps, forward of said main lift webbing; and
    means for tightening said webbed strap pair operably attached to one of said diagonal back straps and said pair of webbed straps;
    a pair of adjustable buckles through each of which one of said pairs of webbed straps is threaded;
    a pair of strap retainers slidably mounted about each of said diagonal backstraps aft of each of said main lift webbings; and
    a pair of buckle straps each attached at the end of each of said strap retainers at one end and to each of said buckles at the other end.

2. An improved parachute torso harness according to claim 1 wherein each of said webbed straps is attached to one of said groin straps by stitching said webbed strap to said groin strap.

3. An improved parachute harness according to claim 1 wherein said webbed strap attached to each groin strap is attached just below the lap strap attachment point.

4. An improved parachute torso harness according to claim 1 having means for attaching the bitter end of each of said webbed straps to said webbed strap after threading said webbed strap through one of said pair of buckles.

5. An improved parachute torso harness according to claim 4 wherein said attaching means comprises:
    a first reusable adhering strip attached to the bitter end of said webbed strap; and
    a second reusable adhering strip attached to said webbed strap between said buckle and said attachment to said groin strap, for mating said first reusable adhering strip in a fixed position.

6. An improved torso harness according to claim 1 wherein each of said pair of buckles is a friction adapter which grips said webbed strap with a tightness proportionate to the longitudinal tension in said strap.

* * * * *